Jan. 22, 1957

C. E. SINGLETON 2,778,981

INDEXING MECHANISM

Filed Jan. 18, 1954

INVENTOR:
Clair E. Singleton
By Herbert E. Metcalf
His Patent Attorney

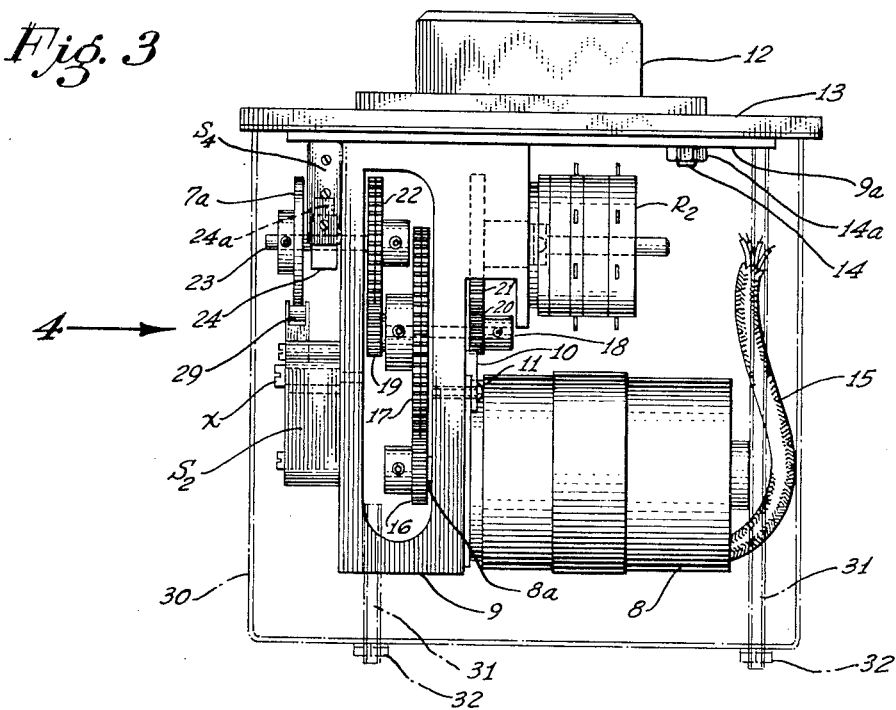
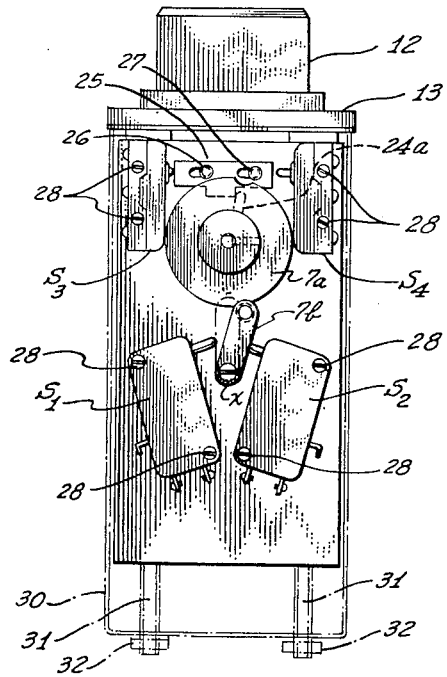
INVENTOR:
Clair E. Singleton
His Patent Attorney 2,778,981

Patented Jan. 22, 1957

2,778,981

INDEXING MECHANISM

Clair E. Singleton, Redondo Beach, Calif., assignor to Northrop Aircraft, Inc., Hawthorne, Calif., a corporation of California Application January 18, 1954, Serial No. 404,553

7 Claims. (Cl. 318—120)

This invention relates generally to means for assuring correlation of a controller and controlled means, which is remotely located, when the controller is placed in an index condition. More particularly, the invention relates to indexing mechanism in a remote radio control system wherein remotely located control means is assured correct correspondence of adjustment with an index setting of regulating means.

In a radio control system for control of aircraft, for example, a ground controller governs a transmitter which radiates signals that are received by a receiver carried on board the controlled aircraft. The output of this receiver consists of several signal channels connected for suitable control of an autopilot. It is desirable that the autopilot settings for each control channel thereof is assured correlation with the settings of the ground controller. This is necessary particularly if the aircraft is not continuously under observation and occasional failure of autopilot response to the radiated signals occur. Thus, when the controller is set at an index setting, an autopilot control channel may not be at the correct corresponding setting.

It is an object of the present invention to provide means for insuring the correct setting of an autopilot, for example, for an index setting of a ground controller in a remote radio control system.

It is another object of this invention to provide a new and novel indexing mechanism for control of electrical switches whereby suitable control of an autopilot can be secured.

Another object of this invention is to provide indexing means useable in a pulse operated control system.

A further object of the invention is to provide indexing means which is simple of construction and compact for easy packaging.

Briefly, the foregoing and other objects are preferably accomplished by providing indexing mechanism comprising a single-notch cam driven by a stepper motor assembly of two rotary solenoids rotatably driving the cam in either of two directions. A suitably pivoted lever arm engages with the cam and is in a null position when aligned directly with the notch. An extended actuating fixture is also attached to the cam, this fixture engaging limit switch operating means after cam rotation in either direction of approximately 180 degrees, for example. The lever arm is balanced between the actuating pins of two single pole, double throw switches in the null (index) position. A ground pulse source (ground pulser) and a multiple pole control relay are connected to and controlled by the two forementioned switches whereby an index condition of the system requires a null setting of the cam and lever arm, this setting being produced by action of the pulser and control relay if the null setting does not exist. The cam can be coupled to drive a tap of a potentiometer to provide an output signal for external control.

This invention possesses other objects and features, some of which together with the foregoing, will be set forth in the following description of a preferred embodiment of the invention, and the invention will be more fully undertsood by reference to the accompanying drawings, in which:

Figures 3 and 4 are drawings illustrating a preferred construction of a packaged output assembly, the assembly including a preferred embodiment of the indexing mechanism (Figure 4).

Figure 1:
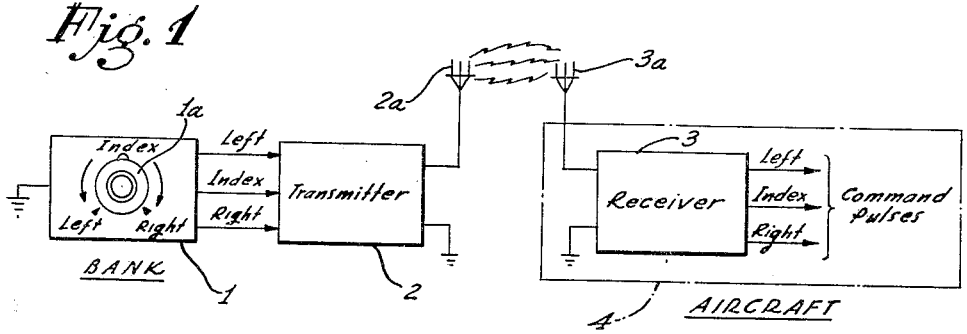
Figure 1 is a simplified schematic diagram of a radio control system for remote control of aircraft, for example.

Referring first to Figure 1, there is shown a schematic diagram of a radio control system for the remote control of aircraft, for example. Only one channel, that of bank control of the aircraft, is shown in this figure; however, there are, in addition, similar channels for control of aircraft attitude and airspeed. Ground equipment consists of a controller 1 which, in this instance, is represented by the one bank control channel having an output feeding into a transmitter 2. The controller 1 has a control knob 1a thereon which is normally positioned to an index setting, as illustrated. When the knob 1a is rotated in a clockwise direction (right), signals are produced in a controller output lead (labeled Right) which keys the transmitter 2 such that a series of pulses of a certain carrier frequency is radiated from an antenna 2a. These "tone" pulses are received by a receiver 3 through reception by an antenna 3a mounted on the controlled aircraft 4. The receiver 3 filters the received "tone" signals into the proper channel such that a series of command pulses appear in a receiver output lead (Right) which is applied to means controlling the autopilot of the aircraft 4. These command pulses will cause the aircraft 4 to bank right an amount proportional to the rotation of knob 1a.

If the heading of the controlled aircraft is again desired to be changed, this time in an opposite direction the knob 1a is now rotated in a counterclockwise direction (left). When this is done, signals are produced in a controller output lead (Left) which keys the transmitter 2 such that a series of pulses of another carrier frequency, different from that of before, is radiated from the antenna 2a. These tone pulses are received and filtered by receiver 3 into the correct channel such that a series of command pulses appear in another receiver output lead (Left) which is applied to the aircraft controlling means to bring the craft back towards an unbanked condition which is to be assumed when the knob 1a is returned to index position. In index position, a signal is produced in another controller output lead (Index) which keys the transmitter 2 such that a constant signal of a carrier frequency different from those of before is radiated from antenna 2a. This index signal becomes a short pulse when the knob 1a is rotated through index position without stopping. The index signal is also received by receiver 2 and provides a command pulse in a receiver output lead (Index) which is used to ensure that the aircraft control means are placed in a condition corresponding to the index setting of knob 1a. The indexing means and manner that this is done is described later below.

Continued rotation of knob 1a in a counterclockwise direction produces additional command pulses in the receiver output lead (Left) which cause the aircraft 4 to bank left in accordance with the rotation of knob 1a. Thus, rotation of knob 1a in a clockwise direction will produce command pulses which cause the controlled aircraft 4 to bank right while rotation of knob 1a in a counterclockwise direction will produce command pulses which cause the aircraft 4 to bank left. In index position, an index signal is produced, this signal being utilized to assure correspondence of aircraft 4 control means setting with controller 1 setting at this reference position. It is to be noted that these command pulses are preferably ground pulses. Thus, the source of these pulses can be represented in simplified form as a switch placed in each lead connecting it to ground, these switches being operated in accordance with knob 1a rotation to produce the ground pulses in the different leads. The bank channel leads can be connected to control means as shown in Figure 2, these means including indexing means.

Figure 2:
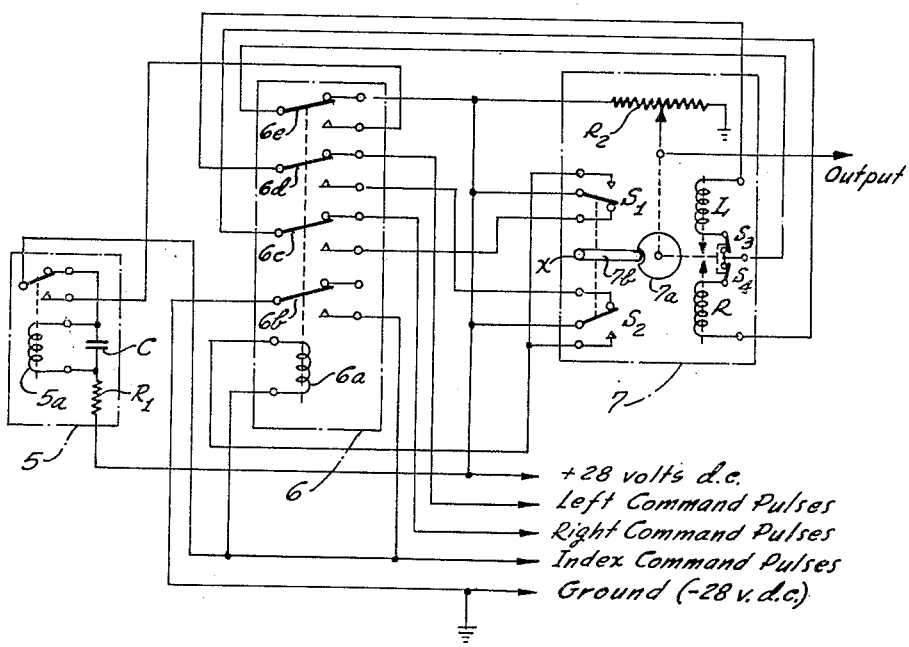
Figure 2 is a circuit diagram of a preferred indexing control system.

The receiver output leads can be connected to the correspondingly labeled leads of Figure 2 to provide a source of command pulses. These leads comprise the input to the circuit shown in Figure 2. There are essentially three components interconnected as shown in this circuit, these being a ground pulser 5, a four pole, double throw relay 6 and an output assembly 7 which includes indexing mechanism for the system. The circuit is correctly shown in a de-energized condition corresponding to index setting of knob 1a (Figure 1). For the instance wherein the knob 1a was rotated in a clockwise direction a certain amount, a series of ground command pulses appears in the Right lead. These ground pulses periodically complete the circuit through pole 6c, rotary solenoid coil R, limit switch S4, pole 6e to +28 volts D. C. The action of coil R, for each ground pulse, is to rotate a cam 7a in definite steps in a clockwise direction. A lever arm 7b is deflected on pivot x upwards since the end of arm 7b is cradled in a notch on the cam 7a, the clockwise rotation of cam 7a forcing arm 7b from a centered position. This action switches the pole of a switch S1 from a lower contact to an upper one. The tap of a rotary potentiometer R2 is also coupled to cam 7a. One end of R2 is connected to +28 volts D. C. and the other end is grounded. An output signal is derived from a connection to the tap of R2, this signal decreasing in magnitude for clockwise rotation of cam 7a and increasing in magnitude for counterclockwise rotation thereof. This signal can be used to govern the autopilot of the controlled aircraft.

The pole of switch S1 is connected to +28 volts. The switching of S1 to the upper contact thus connects power to coil 6a of relay 6. The other end of coil 6a is connected to the Index lead. The coil 6a will be energized whenever a ground pulse appears in this lead. The pole of ground pulser 5 is also connected to the Index lead. Ground pulser 5 is formed from a single pole, double throw relay having a capacitance C (2 mfd., for example) connected across energizing coil 5a. A resistance R1 (4700 ohms, for example) connects one end of coil 5a to +28 volts and the other end is connected to the upper contact of the relay, as shown. When the knob 1a is at index position, a constant ground command signal appears at the Index line. Since this completes the circuit from +28 volts to resistance R1, through capacitance C and the pole of pulser 5 by way of the upper contact back to the Index lead, the capacitance C is gradually charged until the voltage across C is sufficient to actuate the pole of pulser 5 thus removing the ground connection and capacitance C discharges through coil 5a. The pulser operates cyclically until the ground signal is removed from the Index lead. Since the lower contact of pulser 5 is connected to the lower contact of pole 6e, the ground pulses created by pulser 5 is not passed by pole 6e unless relay coil 6a is energized. It is observed that coil 6a does not become energized unless arm 7b is off center and a ground signal appears on the Index lead. This condition exists when the controller 1 (Figure 1) is set such that knob 1a is at index position but the indexing mechanism of assembly 7 does not correspond in its proper centered setting at the same instant.

When knob 1a is rotated counterclockwise back to index position from a right bank (clockwise rotation) position, ground command pulses appear in the Left lead of Figure 2. These pulses are carried through pole 6d, which is making contact with the upper contact for this pole, to rotary solenoid coil L, through limit switch S3, back through pole 6e and the upper contact thereof to +28 volts D. C. These pulses rotate cam 7a a discrete increment or step in a counterclockwise direction for each pulse. Thus, after a number of pulses adequate to center arm 7b, the tap of potentiometer R2 is also brought back to a center position. This action provides an output voltage which can be used to regulate the autopilot of the controlled aircraft returning it to unbanked flight. When knob 1a is stopped at index position or passed through this position, a continuous index or short index command pulse is respectively provided at the Index lead of Figure 2. If the lever arm 7b is not centered and is still deflected upwards, for example, then switch S1 would be actuated to make contact with the upper contact thereof when a ground pulse appears on the Index lead. This pulse causes relay coil 6a to become energized and the poles are actuated to make contact with their respective lower contacts. Pole 6b is a locking connection, this pole providing a ground for coil 6a to hold relay 6 in an actuated condition so long as switch S1 (or S2) is deflected from providing a ground for coil 6a to hold relay 6 in an actuated condition so long as switch S1 (or S2) is deflected from its normal position. This pole 6b through the lower contact thereof also provides a ground connection to the pole of the pulser 5. The periodic actuation of the pulser pole provides a ground pulse through pole 6e in actuated position, through switch S3, rotary solenoid coil L, pole 6d in actuated position, switch S2 in an unactuated condition and finally to +28 volts. Thus, coil L is periodically energized to rotate cam 7a until switch S1 is returned to normal (when arm 7b is centered by cam 7a) and relay 6 is de-energized. Rotary solenoid coil R was not excited at this time because switch S1 did not make contact with the lower contact thereof. In this way, the positioning of the tap on potentiometer R2 is assured correspondence with the setting of knob 1a at a reference (index) point and any loss in steps or misbehavior of the rotary solenoids to the command pulses can be corrected each time the knob 1a is placed at the index setting.

A preferred embodiment of the output assembly 7 is shown in Figures 3 and 4. Figure 4 clearly illustrates a preferred embodiment of the indexing mechanism for this system. Referring jointly to these two figures, a stepper motor 8 which consists of the two rotary solenoids L and R assembled to engage a common output shaft is mounted on a shaped, hollow frame 9. The stepper motor 8 is secured to frame 9 by means of mounting brackets such as 10 and screws 11. A flat plate 9a orthogonally disposed in general to the frame 9 is an integral part of the frame structure and is actually the base thereof. An electrical pin receptacle 12 is located on top of a plate 13 and four bolts such as 14 (countersunk in the flange of receptacle 12) and passing through plates 13 and 9a secure together these three elements by means of four nuts such as 14a. The pin connections in receptacle 12 are connected by wires, such as 15, to the rotary solenoid coils in stepper motor 8, terminals on potentiometer R2, switches S1, S2, S3 and S4. A plug connector (not shown) to receptacle 12 can provide lines to connect with external equipment in accordance with the wiring diagram of Figure 2.

A small gear 16 is secured to the end of the output shaft 8a of the stepper motor 8. This gear 16 meshes with a larger, split (anti-backlash) gear 17 which is secured to a freely rotatable shaft 18. Two smaller gears 19 and 20 are affixed to each end of the shaft 18 as shown. The gear 20 meshes with a gear 21 which is secured to the end of the shaft of potentiometer R2 thereby driving the tap of R2 according to the rotation of stepper motor 8. The other gear 19 meshes with another split gear 22 which is secured to the end of a rotatable shaft 23. The cam 7a is secured to the other end of shaft 23. A fixture 24 is also attached to shaft 23 having a bar 24a extending outwardly from the hub of the fixture and aligned with a notch on cam 7a. This bar 24a engages with a central projection of a T-shaped member 25 as shown in Figure 4. The member 25 has two short slots through which are passed two pins 26 and 27. These two pins 26 and 27 are fixed to frame 9 and the heads thereof prevent the T-shaped member from moving outwards only toward the cam 7a. Thus, lateral (sideways) movement only is permitted. The T-shaped member 25 is normally positioned between the two spring loaded pins of switches S₃ and S₄, the member being moved by bar 24a to actuate switch S₃ (as shown) or switch S₄ after nearly 180 degrees rotary movement from a null (index) position counterclockwise or clockwise, respectively. S₃ and S₄ are limit switches which break the circuit to rotary solenoid coils L and R, respectively.

Switches S₁ and S₂ are mounted on frame 9 by securing screws 28 as are limit switches S₃ and S₄. These four switches are positioned as shown in Figure 4 such that when lever arm 7b rotataing on pivot x is centered between the switch actuating pins of S₁ and S₂ by the notch on cam 7a engaging roller 29 (Figure 3), all four switches are in their normal condition as illustrated in Figure 2. The entire output assembly is fuly enclosed by a cover 30 which is slipped over the assembly onto threaded guide rods 31 which are rigidly attached to frame 9 (and plate 9a) extending downwardly as shown. Nuts 32 secure cover 30 in place to provide a fully packaged unit.

Thus, means are provided wherein a remote radio control system between a fixed controller unit and a controlled craft, the controller adjustment is assured correlation between control means carried on board the controlled craft, this correspondence of means being indexed at a reference position of the controller unit whenever such an adjustment is made. A preferred embodiment of the invention has been shown, however, it should be understood that the invention is not limited to the specific features shown, but that the means and construction herein disclosed comprises the preferred form of several modes of putting the invention into effect and the invention is, therefore, claimed in any of its forms or modifications within the legitimate and valid scope of the appended claims.

What is claimed is:

1. Indexing mechanism, comprising: a single-notch circular cam rotatably mounted and adapted to be driven in a clockwise or counter-clockwise direction; a pivotably mounted lever arm having a roller on the end thereof, said roller engaging with the notch on said circular cam to align said lever arm in an index position; a first and second switching means having respective actuating pins, said first switching means positioned on one side of said lever arm with the actuating pin touching the side of said lever arm and said second switching means positioned on the other side of said lever arm with the actuating pin touching the other side of said lever arm in the index position, whereby movement of said cam in a clockwise direction from said index position rotates said pivoted lever arm to actuate said first switching means and movement of said cam in a counter-clockwise direction from said index position rotates said pivoted lever arm to actuate said second switching means; a stepper motor having a left rotary solenoid coil and a right rotary solenoid coil and coupled to rotate said cam in discrete incremental steps; a pulser for generating ground pulses; a source of power connected to said first and second switching means; and connecting means, when excited, for connecting the output of said pulser to an end of each said solenoid coils, said first switching means in actuated position connected to excite said connecting means and in actuated position connected to the other end of said right rotary solenoid coil, said second switching means in actuated position connected to excite said connecting means and in unactuated position connected to the other end of said left rotary solenoid coil, whereby when said pulser is energized, said left solenoid coil is periodically energized if said first switching means is actuated and said right solenoid coil is periodically energized if said second switching means is actuated, until said cam assumes index position and said first and second switching means are in unactuated positions.

2. Apparatus in accordance with claim 1 wherein said connecting means is a multiple pole, double throw relay.

3. Apparatus in accordance with claim 1 including, in addition, a potentiometer having an adjustable tap adapted to be driven by said cam, a source of voltage connected across said potentiometer and output means connecting said tap and one end of said potentiometer whereby an output signal is provided varying in accordance with the rotation of said cam.

4. Indexing mechanism, comprising: a single-notch circular cam rotatably mounted and adapted to be driven in a clockwise or counter-clockwise direction from an index position; a pivotally mounted lever arm having a roller on the end thereof, said roller engaging with the notch on said circular cam to align said lever arm in index position; a first and second switching means having respective actuating pins, said first switching means positioned on one side of said lever arm with the actuating pin touching the side of said lever arm, and said second switching means positioned on the other side of said lever arm with the actuating pin touching the other side of said lever arm in the index position, said first switch actuated by said lever arm due to clockwise rotation of said cam from said index position and said second switching means actuated by said lever arm due to counter-clockwise rotation of said cam from said index position; a fixture having an extended rod thereon, said fixture attached to rotate with said cam with the extended rod aligned with said notch on said cam; a T-shaped member mounted diametrically opposed said pivoted lever arm and restrained to lateral movement, said extended rod to engage with the central projection of said member to move said member laterally in one direction or the other depending upon the direction of cam rotation after nearly 180 degrees rotation from the index position; a third and fourth switching means having respective actuating pins, said third switching means positioned to one side of said T-shaped member with the actuating pin touching one end of the cross bar of said member and said fourth switching means positioned to the other side of said T-shaped member with the actuating pin touching the other end of the cross bar, said third switching means actuated only when the extended rod on said fixture rotating clockwise engages the central projection of said T-shaped member moving said member laterally to actuate said third switching means and said fourth switching means actuated only when the extended rod on said fixture rotating counter-clockwise engages the central projection of said T-shaped member moving said member laterally to actuate said fourth switch, whereby respective means connected to said switching means are controlled according to the actuation of said respective switching means; a stepper motor having a left rotary solenoid coil and a right rotary solenoid coil and coupled to rotate said cam in discrete incremental steps; a pulser for generating ground pulses; a source of power connected to said first and second switching means; and connecting means, when excited, for connecting the output of said pulser to an end of each said solenoid coils, said first switching means in actuated position connected to excite said connecting means and in unactuated position connected to the other end of said right rotary solenoid coil, said second switching means in actuated position connected to excite said connecting means and in unactuated position connected to the other end of said left rotary solenoid coil, whereby when said pulser is energized, said left solenoid coil is periodically energized if said first switching means is actuated and said right solenoid coil is periodically energized if said second switching means is actuated, until said cam assumes index position and said first and second switching means are in unactuated positions.

5. Apparatus in accordance with claim 4 including, in addition, a potentiometer having an adjustable tap adapted to be driven by said cam, a source of voltage connected across said potentiometer and output means connecting said tap and one end of said potentiometer whereby an output signal is provided varying in accordance with the rotation of said cam.

6. Apparatus in accordance with claim 4 wherein said third switching means is connected in series with said left rotary solenoid coil and said fourth switching means is connected in series with said right rotary solenoid coil whereby actuation of said third and fourth switching means limits the activation of said respective rotary solenoid coils.

7. Apparatus in accordance with claim 4 wherein said connecting means is a multiple pole, double throw relay.

References Cited in the file of this patent
UNITED STATES PATENTS
1,249,043    Dickinson _____ Dec. 4, 1917